(12) United States Patent
Catala

(10) Patent No.: US 6,263,729 B1
(45) Date of Patent: Jul. 24, 2001

(54) METHOD OF DETERMINING THE HYDROCARBON FLOW RATE IN A MULTI-PHASE FLUID FLOWING IN AN OIL WELL

(75) Inventor: Gérard Catala, Meudon (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/326,354

(22) Filed: Jun. 4, 1999

(30) Foreign Application Priority Data

Jun. 11, 1998 (FR) .................................................. 9807350

(51) Int. Cl.$^7$ ............................. E21B 47/10; G01V 3/18

(52) U.S. Cl. ........................................ 73/152.19; 324/324

(58) Field of Search ........................ 73/152.19, 152.32, 73/152.42, 152.51, 152.55; 324/324, 355, 663; 367/31

(56) References Cited

U.S. PATENT DOCUMENTS

| | | | |
|---|---|---|---|
| 4,433,573 | * 2/1984 | Hulin ................................. | 73/152.32 |
| 4,628,725 | * 12/1986 | Gouilloud et al. ................... | 73/19.03 |
| 4,813,270 | * 3/1989 | Baillie ................................ | 73/861.04 |
| 4,974,446 | * 12/1990 | Vigneaux ........................... | 73/152.42 |
| 4,975,645 | * 12/1990 | Lucas .................................. | 324/324 |
| 5,276,656 | 1/1994 | Angehrn et al. . | |
| 5,361,206 | 11/1994 | Tabeling et al. . | |
| 5,586,027 | 12/1996 | Carlson et al. . | |

FOREIGN PATENT DOCUMENTS 0 733 780 A1  9/1996  (EP) .

OTHER PUBLICATIONS

Didek, M. et al., "New Production Logging Tool Enables Problem Well Diagnosis: a Case Study", SPWLA 37$^{th}$ Annual Logging Symposium, Jun. 16–19, 1996, New Orleans.

* cited by examiner

Primary Examiner—Hezron Williams
Assistant Examiner—Jay L. Politzer
(74) Attorney, Agent, or Firm—Brigitte L. Jeffery

(57) ABSTRACT

The method of the invention makes it possible to determine the hydrocarbon flow rate Qhe in an oil well in production, by causing data acquisition apparatus to pass along the well once only, the data acquisition apparatus being provided with local sensors making it possible to distinguish between water and hydrocarbon. During the single pass, the hydrocarbon bubble count Bc per unit time, the water holdup Hw in the fluid, and the flow section A of the well are measured. The flow rate Qhe is calculated in real time by using the following relationship:

Figure 1:
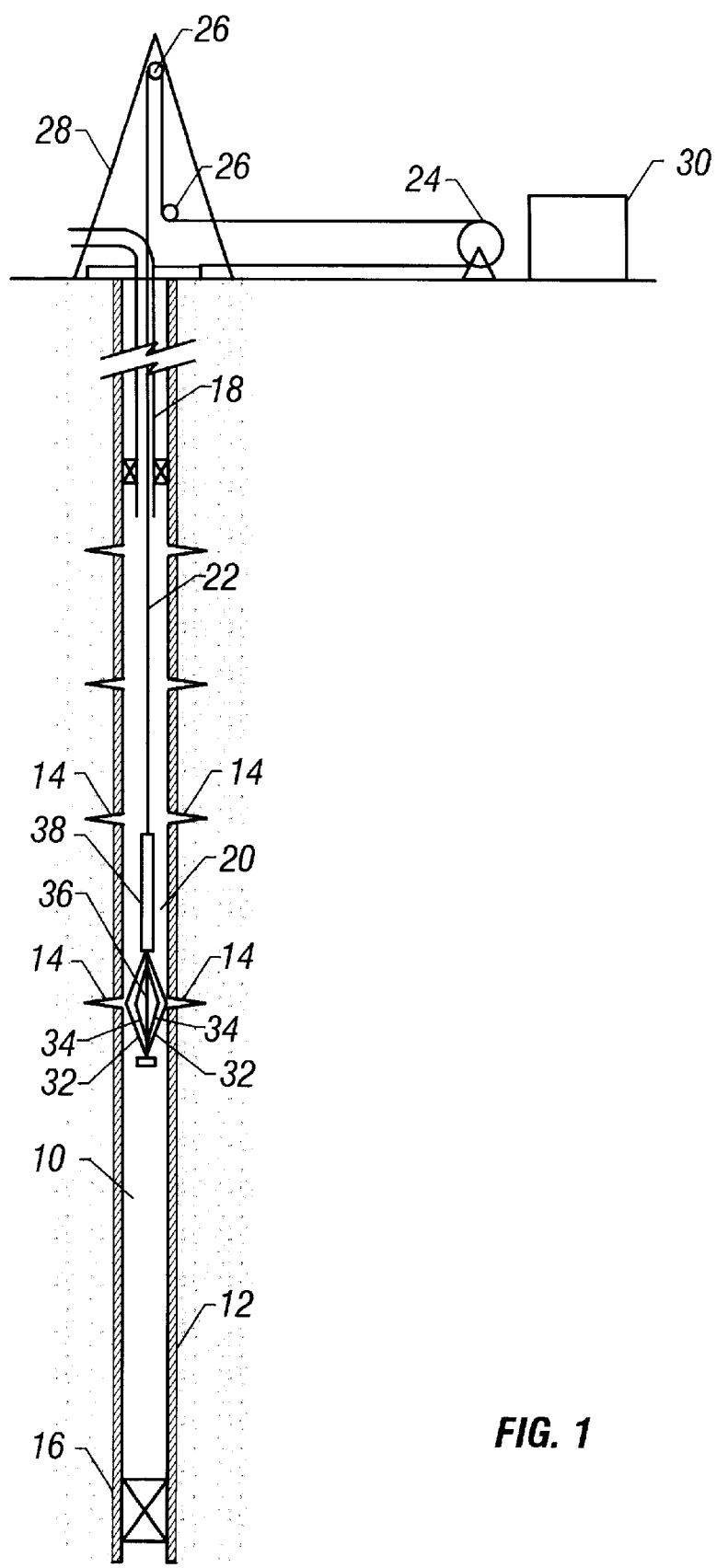

$$Qhe = \frac{2}{3}(Bc \cdot d - Cs(1 - Hw)) \cdot A$$

where $\underline{d}$ represents the diameter of the hydrocarbon bubbles and is calculated by applying a mathematical model. This model is preferably given by the following relationship:

$$Hw^\alpha$$

$$d = D(dn/D)$$

where D is the diameter of the well, $\alpha$ is a coefficient generally equal to 0.3, and $\underline{dn}$ is the nominal diameter of the hydrocarbon bubbles when the water holdup Hw ends towards 1. $\underline{dn}$ is generally chosen to be equal to 1.5 mm.

10 Claims, 4 Drawing Sheets

US 6,263,729 B1

METHOD OF DETERMINING THE HYDROCARBON FLOW RATE IN A MULTI-PHASE FLUID FLOWING IN AN OIL WELL

TECHNICAL FIELD

The present invention relates to a method designed to determine the flow rate of at least one hydrocarbon phase contained in a multi-phase fluid flowing in an oil well.

More precisely, the method of the invention is designed to make use of the results of measurements taken by a data acquisition apparatus that is displaced in an oil production well, in order to monitor the parameters thereof.

STATE OF THE ART

In an oil well in production, and, in particular, in a well that is quite old, the fluid that flows out from the well is generally a fluid that is in two phases or three phases. When it is a three-phase fluid, the fluid contains liquid petroleum, gas, and water.

For the operators of an oil well, it is essential to monitor the variation(s) in the flow rate(s) of the hydrocarbon phase(s) contained in the fluid, i.e. the flow rate of the liquid petroleum and/or the flow rate of the gas.

Data acquisition apparatus provided with sensors is currently available for performing such monitoring. When a measurement is to be taken, the apparatus is lowered into the well and displaced at constant velocity therein, while the well is otherwise under normal production conditions.

In some types of apparatus, the results of the measurements are transmitted to the surface in real time, e.g. by means of a telemetry system using the cable from which the apparatus is suspended.

In other types of apparatus, the results are recorded down-hole, inside the apparatus, for subsequent use.

As disclosed, in particular, in U.S. Pat. No. 5,661,237 and in European Patent Application 0 866 213, such apparatus is equipped with a plurality of local sensors which produce signals at different levels depending on which phase of the fluid is in contact with the sensor. Such sensors may, in particular, be of the electrical, optical, or radio-frequency type, or of some other type. Some such local sensors (e.g. electrical sensors) distinguish merely between hydrocarbon (oil and gas) and water. Other sensors (e.g. optical sensors) distinguish between all three phases.

Generally, such data acquisition apparatus is also equipped with a spinner flowmeter placed on the axis of the well, and with means for measuring the flow section of the well.

Measurements taken down-hole are supplemented by measurements taken at the surface, such surface measurements including, in particular, measurement of the speed of advance of the cable from which the apparatus is suspended. They may also include measurement of the flow rate of the fluid flowing out from the well.

As indicated in particular by M. Didek et al in "*New Production Logging Tool Enables Problem Well Diagnosis: A Case Study*", SPWLA 37th Annual Logging Symposium, Jun. 16–19, 1996, the logging signals delivered by the local sensors (electrical sensors in that case) are used to acquire two parameters. One of the two parameters is the number of hydrocarbon bubbles per second or "bubble count". The other parameter is the fraction of water in the fluid or "water holdup".

In the state of the art, and as also specified by M. Didek et al, the hydrocarbon flow rate is determined on the basis of the hydrocarbon bubble count per second as measured by the local sensors, with the apparatus being displaced at different velocities in the well. That technique is based on the observation that the higher the relative velocity between the hydrocarbon bubbles and the apparatus, the higher the bubble count per second, and vice versa. The bubble count per second as seen by the local sensors thus becomes zero when the apparatus is travelling at the same velocity as the hydrocarbon bubbles.

On the basis of that observation, the same data acquisition apparatus is caused to pass along the well a plurality of times at different velocities, and each time, the hydrocarbon bubble count per second is measured. For each pass of the apparatus, the point representative of the hydrocarbon bubble count per second as a function of the displacement velocity of the apparatus is plotted on an orthonormal frame of reference. The line joining the various points obtained in this way is a straight line that is extended to the value corresponding to a hydrocarbon bubble count per second that is equal to zero. The displacement velocity of the apparatus corresponding to that point is considered to be equal to the displacement velocity of the hydrocarbon bubbles. By taking account of the flow section of the well, as also measured by the apparatus, it is possible to deduce therefrom the hydrocarbon flow rate in the well.

That technique suffers from a certain number of drawbacks.

Determining the hydrocarbon flow rate accurately enough generally requires the same data acquisition apparatus to perform more than five successive logging passes. That technique is therefore time-consuming to implement because it can take several hours to perform all of the passes. The apparatus is usually inserted while the valve situated at the bottom of the well is closed at least in part so as to reduce the flow rate of the fluid. Only once the apparatus has reached the level at which the measurements are to be taken is the well fully opened again. It is then necessary to wait for the nominal fluid flow conditions to be re-established before measurement can start.

The lengthiness of the acquisition operations required by that technique makes it very costly because production from the oil well must be interrupted for the same length of time.

In addition, the duration of the data acquisition operations can be a source of errors when the hydrocarbon flow rate varies quite rapidly.

Furthermore, that technique does not make it possible to calculate the flow rates in real time, i.e. during data acquisition.

SUMMARY OF THE INVENTION

An object of the invention is to provide a method designed to determine the hydrocarbon flow rate by means of existing data acquisition apparatus, by using information delivered during a single pass of the apparatus in the well, i.e. in a time that is quite short, and optionally in real time.

According to the invention, there is provided a method of determining the hydrocarbon flow rate $Q_{he}$ in a multi-phase fluid flowing in an oil well, in which method the hydrocarbon bubble count $B_c$ per unit time, the water holdup $H_w$ in the fluid, and the flow section $A$ of the well are measured by displacing a data acquisition apparatus in the well at a velocity $C_s$ which is positive when going downwards, said method comprising the step of deducing the hydrocarbon flow rate Qhe directly from the results of the measurements by using the following relationship:

$$Qhe = \frac{2}{3}(Bc \cdot d - Cs(1 - Hw))A$$

where $\underline{d}$ represents the diameter of the hydrocarbon bubbles and is calculated by applying a mathematical model representative of the variation in said diameter as a function of the water holdup Hw.

In this method, the use of a mathematical model for calculating the diameter of the bubbles makes it possible to determine the hydrocarbon flow rate directly on the basis of the measurements taken during a single pass of the data acquisition apparatus in the well. Preferably, the flow rate is then determined in real time, during the logging operation while the data is being acquired.

In a preferred embodiment of the invention, use is made of a mathematical model which is such that the bubble diameter $\underline{d}$ tends towards the flow diameter D of the well when the water holdup Hw tends towards zero, and is such that the bubble diameter $\underline{d}$ tends towards a nominal diameter $\underline{dn}$ when the water holdup Hw tends towards 1.

Advantageously, use is then made of a mathematical model of the following type:

$$d = D \, (dn/D)^{Hw^\alpha}$$

where $\alpha$ is a coefficient lying in the range 0.1 to 0.5.

In which case, $\alpha$ is advantageously given a value equal to 0.3.

To implement the method of the invention, the nominal diameter $\underline{dn}$ is generally given a value equal to 1.5 mm.

Optionally, when means are available for measuring the overall velocity Vt of the fluid in the well, as is generally the case, it is possible to verify by calculation whether the value of 1.5 mm given to the nominal diameter $\underline{dn}$ is satisfactory.

In which case, an estimated diameter $\underline{de}$ for the hydrocarbon bubbles is deduced from the overall velocity Vt of the fluid in the well by using the following relationship:

$$de = Sf(1-Hw)(Vt+Cs)/Bc$$

where Sf represents a statistical factor that assumes that the bubbles are spherical. An estimated nominal diameter dne is then calculated on the basis of the estimated diameter de, by inverting the above-mentioned mathematical model.

The estimated nominal diameter $\underline{dne}$ is compared with the value 1.5 mm initially given to $\underline{dn}$. When the comparison reveals a mean difference that exceeds a predetermined threshold, the nominal diameter $\underline{dn}$ is given a constant value that is different from 1.5 mm. This operation is then performed at the surface, after the data acquisition apparatus has been raised, on the basis of the measurements taken during the single pass of the apparatus in the well.

To perform this optional verification operation to verify that the value of 1.5 mm given to the nominal diameter d is exact, it is possible to use, in particular, either the total velocity of the fluid, as measured by a spinner with which the data acquisition apparatus is equipped, or the overall velocity of the fluid as measured at the well head.

DETAILED DESCRIPTION OF THE DRAWINGS

Figure 2A:
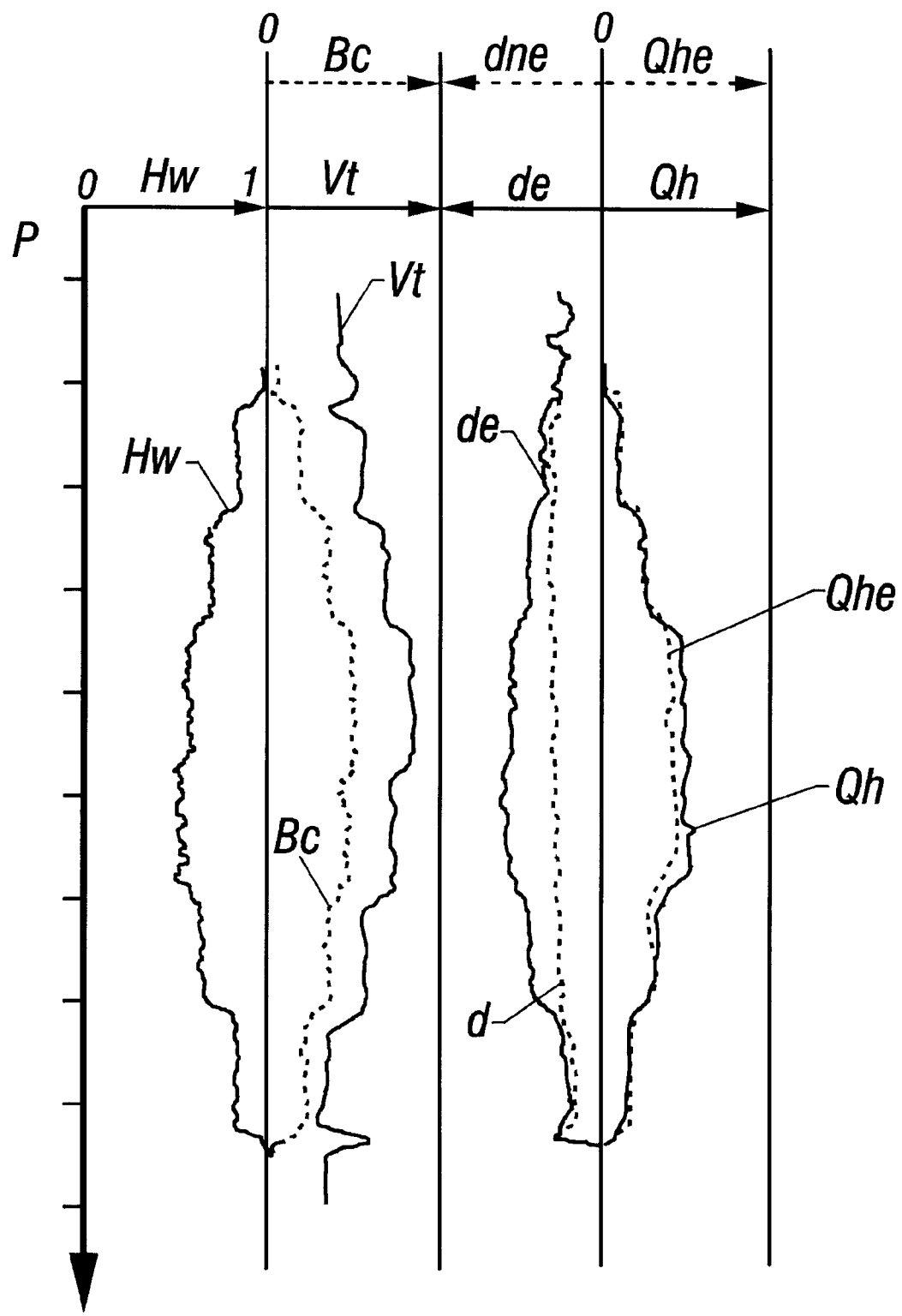
Figure 2B:
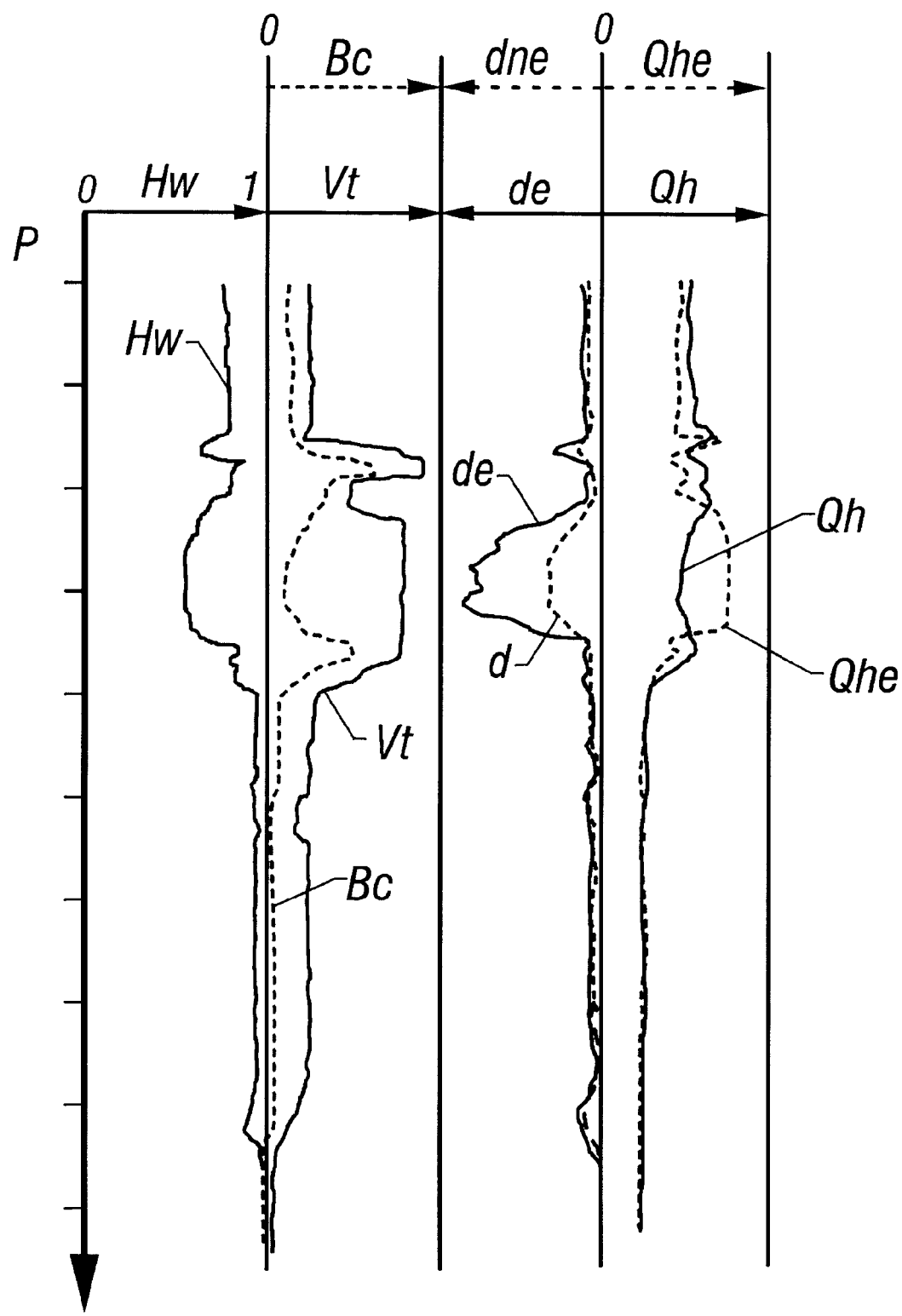
Figure 2C:
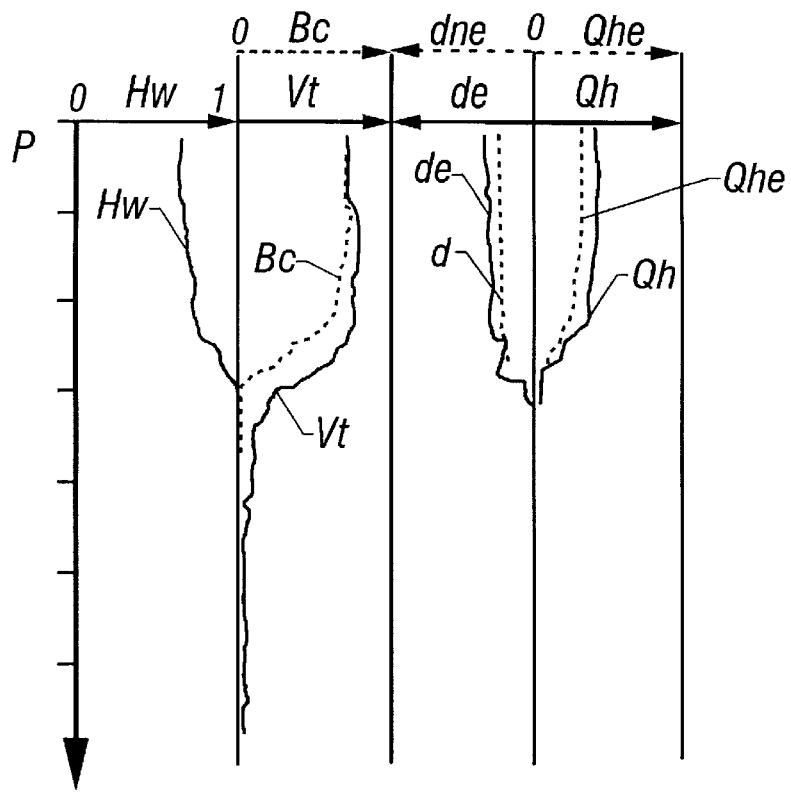
Figure 3:
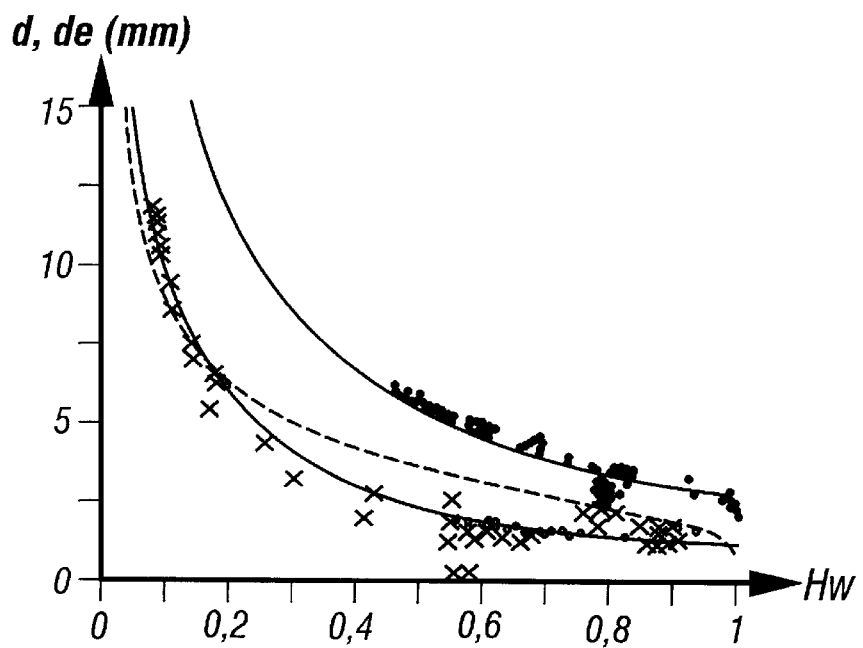

A preferred implementation of the invention is described below by way of non-limiting example and with reference to the accompanying drawings, in which:

FIG. 1 is a highly diagrammatic section view showing the single pass in accordance with the invention of data acquisition apparatus along an oil well that is in production;

FIGS. 2A to 2C are logs obtained during a single logging operation performed by means of data acquisition apparatus of the type shown in FIG. 1, the logs showing, as a function of depth P, the measurements taken by various sensors with which the apparatus is equipped, as well as the results of the calculations performed in real time on the basis of this data, by implementing the method of the invention in three different wells; and FIG. 3 is an orthonormal frame of reference on which a dashed line and solid lines are used to plot how the diameter d of the hydrocarbon bubbles (in mm) varies as a function of the water holdup Hw, respectively by applying a first mathematical model independent of the flow diameter of the well, and by applying a preferred mathematical model that depends of said diameter, points also being plotted that represent how the estimated diameter de (in mm) varies as a function of the water holdup Hw, respectively in the cases of FIG. 2A (· signs), FIG. 2B (° signs), and FIG. 2C (' signs).

DETAILED DESCRIPTION OF A PREFERRED IMPLEMENTATION

In FIG. 1, reference 10 designates an oil well in production. The well is defined by casing 12 which is provided with perforations 14 via which the well communicates with at least one underground hydrocarbon reservoir. The perforations 14 are located between a plug 16 which closes off the bottom of the well and the bottom end of a production string 18 via which the multi-phase petroleum fluid flows to the surface.

To monitor how the production parameters of the well 10 vary over time, in particular in the portion situated between the plug 16 and the bottom end of the production string 18, data acquisition apparatus 20 is inserted via said string. By way of non-limiting illustration, the apparatus 20 may, in particular, be implemented as taught in the above-mentioned patent publications U.S. Pat. No. 5,661,237 and EP-0 866 213.

The data acquisition apparatus 20 is suspended at the bottom end of a cable 22 which passes through the production string 18 to the surface. The opposite end of the cable 22 is wound around a winch 24. Between the winch 24 and the top end of the production string 18, the cable 22 passes over sheaves 26 mounted on a structure 28 overlying the well 10.

In a manner well known to specialists, means (not shown) are provided at the surface, in particular for measuring the depth at which the apparatus 20 is situated, and the velocity at which it moves in the well 10. Usually, means are also provided to measure the overall velocity of the fluid at the outlet of the well. A surface installation 30 is provided with equipment enabling the results of these measurements to be collected and recorded.

The data acquisition apparatus 20 is centered on the axis of the well 10 by arms 32 which are resiliently maintained in abutment against the casing 12 of the well. The arms 32 support a certain number of local sensors 34, such as sensors of the electrical type designed to distinguish between water and hydrocarbon contained in the flow of fluid.

The apparatus 20 is generally provided with other measurement systems such as a spinner flowmeter 36 placed on the axis of the apparatus and making it possible to measure the overall velocity of the fluid in the well. In general, means (not shown) are also provided for measuring the diameter and the flow section of the well. Such means measure, for example, the deployment angles of the arms 32.

When the measurements are relayed to the surface in real time by telemetry via the cable 22, means for recording the results of the measurements (logs) are also provided in the surface installation 30. Otherwise, recorders are placed inside the apparatus 20.

As already mentioned, the invention relates to determining the flow rate of hydrocarbon in the fluid flowing inside the well, mainly on the basis of signals delivered by the local sensors 34 during a single pass of the apparatus 20 in the well.

Thus, as shown by FIGS. 2A to 2C for three different wells, the apparatus 20 also includes an electronic module 38. On the basis of the signals delivered by the local sensors 34 and while the apparatus moves along the axis of the well, the electronic module measures the hydrocarbon bubble count Bc per second (shown by a dashed line in the second column from the left), and the water holdup Hw in the fluid (shown by a solid line in the left column), using a technique well known to specialists and explained in the above-mentioned publication by M. Didek et al.

The results of these two measurements are used by the electronic module 38 to determine directly the flow rate Qhe of the hydrocarbon phases in the fluid, by using the following relationship:

$$Qhe = \frac{2}{3}(Bc \cdot d - Cs(1 - Hw))A \quad (1)$$

In this relationship, Cs represents the displacement velocity at which the apparatus moves in the well (in meters per second (m/s)), as measured at the surface. This velocity is considered to be positive when the apparatus moves downwards.

Furthermore, A represents the flow section of the well (in square meters (m2)). In general, the section is measured by the apparatus 20, as indicated above. Otherwise, the known area of the section of the casing 12 is used.

In above relationship (1), $d$ represents the diameter of the hydrocarbon bubbles (in meters). In accordance with the invention, the diameter $d$ is calculated by applying a mathematical model chosen so as to represent as well as possible how hydrocarbon bubble diameter varies as a function of the water holdup Hw. The main reason for this variation is the phenomenon of bubble coalescence which tends to increase bubble size as the bubble count increases.

Preferably, the mathematical model chosen also takes into account the fact that the maximum hydrocarbon bubble diameter cannot exceed the flow diameter D of the well. The mathematical model is thus such that the bubble diameter $d$ tends towards said flow diameter D when the water holdup Hw tends towards 0.

Finally, the mathematical model chosen also preferably takes into account the fact that, conversely, i.e. when the water holdup Hw tends towards 1, the bubble diameter $d$ tends towards a minimum value referred to as the "nominal diameter" $dn$. The nominal diameter $dn$ can vary from one well to another, because of the physical and chemical properties of the fluids flowing therein. Thus, the mean nominal diameter generally lies in the range 1 mm to 2 mm.

In the preferred embodiment of the invention, by applying these criteria, a mathematical model is obtained that is given by the following relationship:

$$d = D\,(dn/D)^{Hw^\alpha} \quad (2)$$

In this relationship $\alpha$ is a coefficient that lies in the range 0.1 to 0.5, and whose preferred value is 0.3.

Furthermore, in view of the observations made above, the value of the nominal diameter $dn$ is preferably set at 1.5 mm.

In the three examples of logs shown in FIGS. 2A to 2C, the values of the bubble diameter $d$ that are calculated by means of this mathematical model (relationship (2), where $\alpha$= 0.3, and dn=1.5) are plotted in dashed lines in the second column from the left in each figure. The values of the flow rate Qhe of hydrocarbon that are deduced from the diameter $d$ and from the result of the measurements of Bc and of Hw as performed by the apparatus 20, by applying relationship (1), are plotted in solid lines in the right column of each figure.

To take into account the fact that, in some cases, the nominal bubble diameter $dn$ has a mean value that is significantly different from 1.5 mm, the overall velocity Vt of the fluid in the well (in m/s) is measured. The velocity Vt makes it possible to calculate an estimated nominal hydrocarbon bubble diameter $dne$ whose value at the time at which the measurement is taken can be compared with the initially used value 1.5 mm. However, it should be noted that this measurement and the additional verification are optional.

Measuring the overall velocity Vt of the fluid in the well is performed using the spinner flowmeter 36 of the apparatus 20, when said apparatus is provided with such an instrument. Otherwise, any other measurement of the overall velocity of the fluid may be used, in particular a measurement taken at ground level. In FIGS. 2A to 2C, the overall velocity Vt of the fluid, as measured by the spinner 36 of the apparatus 20, is plotted as a solid line in the second column from the left.

On the basis of this measurement and of the values of the water holdup Hw, of the bubble count Bc per unit time, and of the velocity Cs at which the apparatus is displaced, these values also being measured, an estimated diameter $de$ is calculated for the hydrocarbon bubbles by using the following relationship:

$$de = Sf(1-Hw)(Vt+Cs)/Bc \quad (3)$$

In this relationship (3), Sf represents a statistical factor which assumes that the bubbles are spherical. In practice, this statistical factor Sf is equal to 1.5.

In FIGS. 2A to 2C, the values of the estimated diameter $de$ calculated in this way are plotted as a solid line in the second column from the right.

By inverting the mathematical model previously used to calculate the hydrocarbon bubble diameter $d$ (relationship (2), where $\alpha$=0.3), the estimated nominal diameter $dne$ is then calculated on the basis of the estimated diameter $de$. In the case of the mathematical model defined by relationship (2), the estimated nominal diameter $dne$ is calculated using the following relationship:

$$dne = D(de/D)^{1/Hw^{0.3}} \quad (4)$$

By means of relationships (1) and (2), an estimated nominal flow rate Qhe for the hydrocarbon is then calculated and compared with the flow rate Qh calculated by other, more traditional, methods. In FIGS. 2A to 2C, the value of Qhe is plotted as a dashed line in the right column, with the value of Qh.

By studying the resulting logs obtained while the data acquisition apparatus 20 is being displaced over a certain depth inside the well 10, it is possible to determine whether there is a mean difference between the curve dne and the fixed value dn used to calculate the relationship (1).

When the mean difference is very small, as is the case in FIGS. 2A to 2C, no other calculation is performed, and the flow-rate values obtained by applying relationship (1) are considered to be acceptable.

Conversely, if an excessive mean difference is observed between the curve dne and the fixed value dn, it may be decided to perform an additional calculation on the basis of relationships (1) and (2) of the invention, by using a constant value that is different from 1.5 mm for the nominal diameter dn, this value being modified in the direction that tends to reduce the observed difference.

In general, it should be noted that the invention is not limited to the mathematical model defined by relationship (2). Thus, and merely by way of example, the value of the hydrocarbon bubble diameter d in relationship (1) may be calculated by means of a mathematical model that does not take into account the limit values of the hydrocarbon bubble diameter d when the water holdup Hw tends respectively towards 0 and towards 1. A model of this type is given by the following relationship:

$$d = 0.3\,(1-Hw)^{0.25} \times Hw^{-0.5} \quad (5)$$

FIG. 3 makes it possible to compare the accuracy of each of the mathematical models defined respectively by relationships (2) and (5), when the value of $\alpha$ is 0.3 and when dn is equal to 1.5 mm in relationship (2).

In FIG. 3, the water holdup Hw is plotted along the x-axis and the diameter d or the estimated diameter de of the hydrocarbon bubbles is plotted up the y-axis (in mm).

In FIG. 3, the signs represent the variation in the estimated diameter de as a function of the water holdup Hw, as calculated on the basis of the log shown in FIG. 2A, by applying relationship (3) at regular depth intervals. The ° signs and the x signs represent the same variation, as calculated on the basis respectively of the log shown in FIG. 2B and of the log shown in FIG. 2C.

FIG. 3 also shows, plotted as a dashed line, the curve obtained by calculating the variations in the diameter d of the hydrocarbon bubbles as a function of the water holdup Hw by applying the model corresponding to relationship (5).

Finally, the two curves plotted as solid lines represent the variations in hydrocarbon bubble diameter d as a function of water holdup Hw obtained by applying relationship (2), for two flow diameter values D corresponding respectively to the example shown in FIG. 2A and to the examples shown in FIGS. 2B and 2C.

It can be seen that the mathematical model corresponding to relationship (5) gives a satisfactory indication of the orders of magnitude of the diameters of the hydrocarbon bubbles, but it is of limited accuracy. In contrast, the model defined by relationship (2) is relatively accurate, and it thus makes it possible to determine the hydrocarbon flow rate Qhe satisfactorily.

It is thus possible, in accordance with the invention, to determine the hydrocarbon flow rate Qhe by causing the apparatus 20 to make a single pass in the well 10. Monitoring operations are thus made easier compared with currently-used techniques. This leads to significant savings by reducing the time during which the well is taken out of use. This also makes it possible to improve accuracy in a well in which the hydrocarbon flow rate varies rapidly. Finally, this makes it possible to calculate the desired flow rate in real time.

As mentioned above, this method is applicable regardless of the type of sensor 34 equipping the apparatus 20. When the sensors merely discriminate between water and the hydrocarbon phases considered as a whole, be they liquid or gas, the method of the invention makes it possible to determine the overall hydrocarbon flow rate. When the sensors make it possible to distinguish between all three phases that make up the fluid flowing in the well, the method makes it possible to determine separately the flow rate of each of the two hydrocarbon phases, i.e. the flow rate of the liquid petroleum and the flow rate of the gas.

Furthermore, since the overall velocity of the fluid in the well is measured in the method only when it is desired to check that the value of 1.5 mm given to the nominal diameter dn is acceptable, it is possible to use apparatus 20 that is simplified, i.e. not provided with a spinner 36. Such simplified apparatus may also be used even when the above-mentioned checking is performed, by measuring the overall velocity of the fluid at the outlet of the well, i.e. at ground level.

What is claimed is:

1. A method of determining the hydrocarbon flow rate Qhe in a multi-phase fluid flowing in an oil well, in which method the hydrocarbon bubble count Bc per unit time, the water holdup Hw in the fluid, and the flow section A of the well are measured by displacing a data acquisition apparatus in the well at a velocity Cs which is positive when going downwards, said method comprising the step of deducing the hydrocarbon flow rate Qhe directly from the results of the measurements by using the following relationship:

$$Qhe = \frac{2}{3}(Bc \cdot d - Cs(1-Hw)) \cdot A$$

where d represents the diameter of the hydrocarbon bubbles and is calculated by applying a mathematical model representative of the variation in said diameter as a function of the water holdup Hw.

2. A method according to claim 1, in which a mathematical model is applied, which model is such that the bubble diameter d tends towards the flow diameter D of the well when the water holdup Hw tends towards zero, and is such that the bubble diameter d tends towards a nominal diameter dn when the water holdup Hw tends towards 1.

3. A method according to claim 2, in which a mathematical model of the following type is applied:

$$d = D(dn/D)^{Hw^\alpha}$$

where $\alpha$ is a coefficient lying in the range 0.1 to 0.5.

4. A method according to claim 3, in which $\alpha$ is given a value equal to 0.3.

5. A method according to claim 2, in which the nominal diameter dn is given a value equal to 1.5 mm.

6. A method according to claim 2, in which the overall velocity Vt of the fluid in the well is also measured, and an estimated diameter de for the hydrocarbon bubbles is deduced therefrom by using the following relationship:

$$de = Sf(1-Hw)(Vt+Cs)/Bc$$

where Sf represents a statistical factor that assumes that the bubbles are spherical, and an estimated nominal diameter dne is calculated on the basis of the estimated diameter de, by inverting said mathematical model.

7. A method according to claims 5 and 6 in combination, in which the estimated nominal diameter dne is compared with 1.5 mm, and the nominal diameter dn is given a constant value that is different from 1.5 mm when the comparison reveals a mean difference that exceeds a predetermined threshold.

8. A method according to claim 6, in which the statistical factor Sf is given a value equal to 1.5.

9. A method according to claim 1, in which the bubble count Bc and the water holdup Hw are measured in a single logging operation during which the data acquisition apparatus is displaced in the well.

10. A method according to claim 9, in which the flow rate Qhe is determined in real time during the logging operation.

\* \* \* \* \*